Patented Aug. 1, 1933

1,920,311

UNITED STATES PATENT OFFICE 1,920,311

GERMICIDE, FUNGICIDE, ETC., AND METHOD OF USING THE SAME

Morris S. Kharasch, College Park, Md., assignor to E. I. du Pont de Nemours & Company, Wilmington, Del., a Corporation of Delaware No Drawing. Original application October 6, 1923, Serial No. 666,989. Divided and this application July 30, 1928. Serial No. 296,421

3 Claims. (Cl. 167—38.)

The present invention relates to improvements in germicides, fungicides, and the like and to methods of using the same, and will be fully understood from the following description, in which a specific embodiment of the invention is set forth in detail.

This application is a division of my co-pending application Serial No. 666,989, filed October 6, 1923, which has resulted in U. S. Patent 1,787,630, dated January 6, 1931.

In accordance with the present invention, compounds having germicide, fungicide and like properties are produced by the mercurization of substituted anilines capable of forming stable salts in aqueous solution, such anilines including the ortho, meta and para substituted anilines. Any suitable substituted aniline of this type may be employed, for example, the chlor-anilines, the brom-anilines, the sulfonic derivatives, the nitro-anilines, etc.

In preparing the mercurized compound, the substituted aniline of the type set forth, for example, a para or meta nitro-aniline, is dissolved in water together with sufficient acetic acid to keep it in solution, the preferred proportion of acetic acid being slightly greater than that corresponding to a molecular equivalent thereof. The acidulated solution of the substituted aniline is then heated to a moderate temperature, preferably below 100° C., for example, on a water bath, for two or three hours with an aqueous solution of mercuric acetate slightly acidulated with acetic acid, to prevent hydrolysis. The proportion of mercuric acetate employed is the calculated amount required to combine with the amount of substituted aniline present and is sufficient to supply an atom of mercury for each molecule of the substituted aniline.

Although it is preferred that the mixture be moderately heated to accelerate the reaction, such heating is not necessary, as the reaction will also take place if the mixed solutions are allowed to stand at ordinary room temperature for long periods. The termination of the reaction is indicated when a test portion of the solution fails to give a precipitate of mercury sulfiide with ammonium sulfide. Mercurization of the substituted aniline is then complete and the mercurized compound may be removed in any suitable manner, for example, by crystallization, by precipitation as chloride, etc. For example, slightly more than a molecular equivalent of sodium chloride may be added in aqueous solution, the mercurized compound being then precipitated as the chloride. This method of reaction is applicable to the substituted anilines of the type set forth, that is, those capable of forming stable salts in aqueous solution due to the basicity of the nitrogen. As a specific example, the application of the reaction to para-nitro-aniline may be given. The final compound has the formula

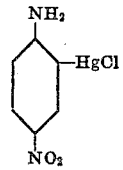

It is yellow in color, powders readily, is only slightly soluble in water; insoluble in ether, somewhat soluble in alcohol and very soluble in acetone and pyridin.

138 parts by weight of para-nitro-aniline together with 60 parts by weight of glacial acetic acid are dissolved in the minimum amount of hot water required for complete solution, approximately 2,000 parts by weight being sufficient. A concentrated solution of mercuric acetate, containing 318.5 parts by weight of the latter, and slightly acidified with acetic acid to prevent hydrolysis, is mixed with the solution of the substituted aniline, and the mixed solutions are warmed on a water bath for one to two hours, until a test for mercury with ammonium sulfide fails to give a precipitate. As stated hereinbefore, it is not necessary to warm the solution on the water bath, as reaction will take place, in a longer period of time, at room temperature. The resulting mercurized compound has the following formula:

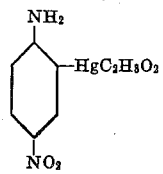

The removal of the mercurized compound is most readily effected by precipitation as the chloride, about 60 parts by weight of sodium chloride in solution being added to effect the precipitation. Any other suitable means may be employed for the removal of the mercurized compound. Instead of using water solutions of the compounds mentioned a suspension or paste of the products in which they are only partly dissolved may be used and treated in a manner similar to that of the water solution. The isolation of the final product is effected exactly as in the case when a water solution is used.

The procedure described may likewise be employed in the mercurizing of other substituted anilines of the type described, for example, meta and ortho nitro-alinine, the corresponding chlor-anilines, brom-anilines, sulfo-anilines, etc. The precipitated mercurized compound, after drying in any suitable manner, may be employed, either in water suspension or as a dry compound, as a germicide, fungicide, etc. and by reason of its relatively low toxicity, it is particularly desirable for use in the treatment of diseases of small grains, such as smut, wheat rust, and the like.

The mercurized compound, for example, mercurized para or meta chlor-phenol, a mercurized nitro-aniline, such as the mercurized para-nitro-aniline hereinbefore referred to, or other similar mercurized substituted anilines, are admixed with inert substances such as talc, chalk, calcium sulfate or the like in proportions of from 5 to 15 per cent, about 10 per cent being preferred. The mixture is then, in the treatment of small grains, dusted over and thoroughly mixed with the seed grain, from 1 to 10 ounces of the mixture being used per bushel of grain. In general about two ounces has been found sufficient. Equivalent amounts of dilute solutions or suspensions may be employed; but the use of the dry mixture of the mercurized compound and an inert substance is preferred, as it effectively destroys the various fungi without tending to cause sprouting or germination of the grain. If it is desired to use the substance in suspension in a liquid, an aqueous suspension containing from one-half to eight per cent of the mercurized compound may be employed, about a one per cent suspension being preferred.

The compound may also be employed in admixture with an inorganic fertilizer such as a phosphatic fertilizer, for the destruction of smut spores and similar disease producing organisms in the soil. In such case, the mercurized compound may be admixed with the fertilizer in proportions from one to ten percent, about five per cent being the preferred proportion.

Mercury compounds containing a HgX radicle attached to a carbon of a substituted benzene ring, may likewise be employed for the treatment of surface diseases, such as scab and other external parasitic infections in potatoes and in fruits of various kinds. They may be applied in water solution or in suspension, or as dry substances, to the surface of the fruits or vegetables being treated in substantially the same manner as in treating grains. All mercurized compounds having the group -HgX attached to a carbon atom of a substituted benzene ring may in general be so employed.

As many apparently widely different embodiments of this invention may be made without departing from the spirit and scope thereof, it is to be understood that I do not limit myself to the specific embodiments thereof except as defined in the appended claims.

I claim:

1. The method of treating small grains which consists in intermixing with the grains a dry mixture comprising a mercurized substituted aniline compound having a mercury atom attached to a carbon of a substituted benzene ring and an inert filler.

2. The method of treating small grains which consists in intermixing with the grains a dry mixture comprising 10% of a mercurized substituted aniline and an inert filler.

3. The method of treating tubers such as potatoes which consists in applying superficially thereto a mercurized substituted aniline compound having a mercury atom attached to a carbon of a substituted benzene ring.

MORRIS S. KHARASCH.